United States Patent
Ouyang et al.

(10) Patent No.: US 11,023,801 B2
(45) Date of Patent: Jun. 1, 2021

(54) DATA PROCESSING METHOD AND APPARATUS

(71) Applicant: BEIJING BAIDU NETCOM SCIENCE AND TECHNOLOGY CO., LTD., Beijing (CN)

(72) Inventors: Jian Ouyang, Beijing (CN); Wei Qi, Beijing (CN); Yong Wang, Beijing (CN); Lin Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1002 days.

(21) Appl. No.: 15/618,817

(22) Filed: Jun. 9, 2017

(65) Prior Publication Data

US 2018/0121789 A1    May 3, 2018

(30) Foreign Application Priority Data

Nov. 3, 2016    (CN) .......................... 201610956704.5

(51) Int. Cl.
*G06E 1/00* (2006.01)
*G06E 3/00* (2006.01)
(Continued)

(52) U.S. Cl.
CPC ............... *G06N 3/04* (2013.01); *G06F 5/012* (2013.01); *G06F 7/483* (2013.01); *G06N 3/0454* (2013.01); *G06N 3/063* (2013.01)

(58) Field of Classification Search
CPC ........... G06F 5/012; G06F 7/483; G06N 3/04; G06N 3/0454; G06N 3/063
See application file for complete search history.

(56) References Cited

U.S. PATENT DOCUMENTS

| 2004/0128331 A1* | 7/2004 | Hinds ................. G06F 9/30025 708/204 |
| 2004/0268094 A1* | 12/2004 | Abdallah ................ H03M 7/24 712/221 |

(Continued)

FOREIGN PATENT DOCUMENTS

CN    104572011 A    4/2015

OTHER PUBLICATIONS

Chinese Application No. 201610956704.5 English translation of First Office Action dated May 2, 2018, 8 pages.
(Continued)

*Primary Examiner* — Luis A Sitiriche
(74) *Attorney, Agent, or Firm* — Lathrop GPM LLP

(57) ABSTRACT

The present application discloses a data processing method and apparatus. A specific implementation of the method includes: receiving floating point data sent from an electronic device; converting the received floating point data into fixed point data according to a data length and a value range of the received floating point data; performing calculation on the obtained fixed point data according to a preset algorithm to obtain result data in a fixed point form; and converting the obtained result data in the fixed point form into result data in a floating point form and sending the result data in the floating point form to the electronic device. This implementation improves the data processing efficiency.

6 Claims, 5 Drawing Sheets

(51) Int. Cl.
*G06F 15/18* (2006.01)
*G06G 7/00* (2006.01)
*G06N 3/04* (2006.01)
*G06N 3/063* (2006.01)
*G06F 5/01* (2006.01)
*G06F 7/483* (2006.01)

(56) References Cited

U.S. PATENT DOCUMENTS

2016/0328646 A1* 11/2016 Lin .................... G06N 3/08
2017/0351493 A1* 12/2017 Kintali ................ H03M 7/24

OTHER PUBLICATIONS

Zhang Xiong-wei, Principle and Application Development of DS Chips, pp. 34-36, Electronics Industry Press, Sep. 30, 1997; 35 pages, cited in CN 201610956704.5 First Office Action (originally disclosed in IDS filed May 29, 2018).

* cited by examiner

__DATA PROCESSING METHOD AND APPARATUS__

CROSS-REFERENCE TO RELATED APPLICATION

This application is related to and claims priority from Chinese Application No. 201610956704.5, filed on Nov. 3, 2016 and entitled "Data Processing Method and Apparatus", the entire disclosure of which is hereby incorporated by reference.

TECHNICAL FIELD

The present application relates to the field of computer technology, specifically to the field of data processing technology, and more specifically to a data processing method and apparatus.

BACKGROUND

Numerical data processed by computers are mostly decimals. Generally, there are two approaches for representing decimal points in a computer. In one approach, it is agreed that the decimal points of all numerical data are placed at a fixed position. Such a decimal is referred to as fixed point data. In the other approach, the decimal point position can float. Such a decimal is referred to as floating point data. A calculation process for the fixed point data is referred to as fixed point calculation, and a calculation process for the floating point data is referred to as floating point calculation. Generally, floating point calculation consumes more resources than fixed point calculation.

However, in conventional data processing methods, floating point calculation is generally performed on received floating point data, and then a calculation result in the floating point form is returned. The calculation process of the floating point data consumes a large amount of resources and takes a long time, and thus the data processing efficiency is low.

SUMMARY

An objective of the present application is to provide an improved method and apparatus for processing data, in order to solve the technical problem mentioned in the Background.

According to a first aspect, the present application provides a data processing method. The method includes: receiving floating point data sent from an electronic device; converting the received floating point data into fixed point data according to a data length and a value range of the received floating point data; performing calculation on the obtained fixed point data according to a preset algorithm to obtain result data in a fixed point form; and converting the obtained result data in the fixed point form into result data in a floating point form and sending the result data in the floating point form to the electronic device.

According to a second aspect, the present application provides a data processing apparatus. The apparatus includes: a receiving unit, configured to receive floating point data sent from an electronic device; a conversion unit, configured to convert the received floating point data into fixed point data according to a data length and a value range of the received floating point data; a calculation unit, configured to perform calculation on the obtained fixed point data according to a preset algorithm to obtain result data in fixed point form; and a sending unit, configured to convert the obtained result data in the fixed point form into result data in a floating point form and send the result data in the floating point form to the electronic device.

With the data processing method and apparatus provided in the present application, floating point data sent from an electronic device is received; the received floating point data is converted into fixed point data according to a data length and a value range of the received floating point data; calculation is performed on the obtained fixed point data according to a preset algorithm to obtain result data in a fixed point form; and the obtained result data in the fixed point form is converted into result data in a floating point form and the result data in the floating point form is sent to the electronic device. Thus, a more efficient fixed point calculation can be performed on the floating point data, thereby improving the data processing efficiency.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
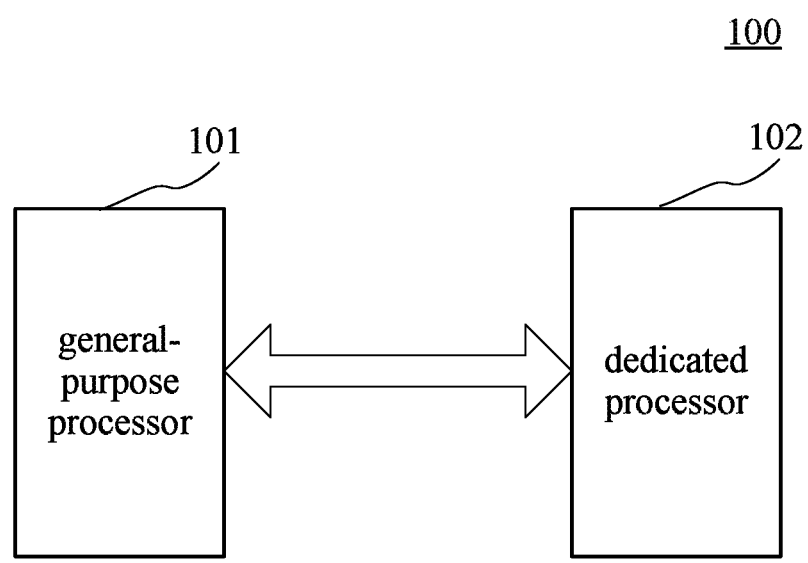
FIG. 1 is a diagram illustrating an exemplary system architecture to which the present application can be applied.

FIG. 1 illustrates an exemplary system architecture 100 to which a data processing method according to an embodiment of the present application is applicable. As shown in FIG. 1, the system architecture 100 may include a general-purpose processor 101 and a dedicated server 102.

The general-purpose processor 101 is configured to send floating point data to the dedicated processor 102. The dedicated processor 102 may convert the received floating point data into fixed point data, then perform calculation on the obtained fixed point data according to a preset algorithm and obtaining result data in fixed point form, and convert the obtained result data in fixed point form into result data in floating point form and send the result data in floating point form to the general-purpose processor 101. The general-purpose processor 101 may also be referred to as a host, and the dedicated processor 102 may be designed from a Field-Programmable Gate Array (FPGA). Definitely, the dedicated processor 102 may also be implemented on the general-purpose processor 101, and is referred to as a dedicated processor so as to distinguish from the electronic device denoted by 102.

It should be noted that, the electronic device involved in the embodiments of the present application generally refers to the general-purpose processor 101 in FIG. 1, the data processing method provided in the embodiments of the present application is generally performed by the dedicated processor 102, and correspondingly, a data processing apparatus is generally disposed in the dedicated processor 102.

It should be understood that the numbers of the general-purpose processor 101 and the dedicated processor 102 in FIG. 1 are merely schematic. There may be any number of general-purpose processors and any number of dedicated processors as required in practice.

Figure 2:
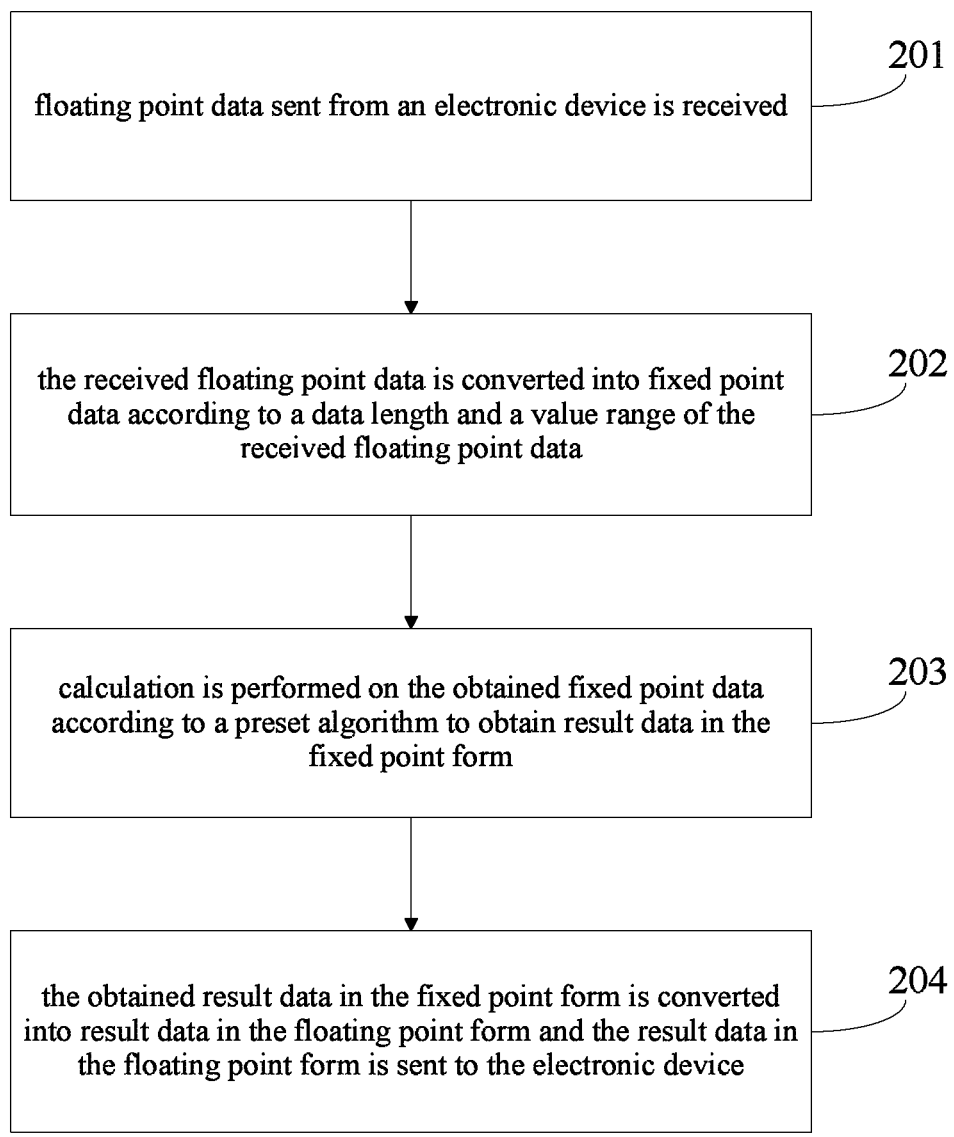
FIG. 2 is a flow chart of a data processing method according to an embodiment of the present application.

Referring to FIG. 2, a flow 200 of a data processing method according to an embodiment of the present application is illustrated. The data processing method includes the following steps.

At step 201, floating point data sent from an electronic device is received.

In this embodiment, a processor (for example, the dedicated processor 102 shown in FIG. 1) on which the data processing method runs may receive floating point data sent by an electronic device (for example, the general-purpose processor 101 shown in FIG. 1).

In some optional implementations of this embodiment, the floating point data may be data received by an application. For example, the floating point data may be a search request received by a search application. Alternatively, the floating point data may be to-be-recognized voice data received by a voice assistant application.

At step 202, the received floating point data is converted into fixed point data according to a data length and a value range of the received floating point data.

In this embodiment, the processor (for example, the dedicated processor 102 shown in FIG. 1) on which the data processing method runs may determine the data length and the value range of the received floating point data first, and then convert the received floating point data into fixed point data according to the determined data length and value range.

In the present application, fixed point to floating point conversion is performed according to the data length and the value range of the received floating point data, so that the conversion precision is improved compared with the conversion according to a large preset data length and value range in the prior art.

Figure 3:
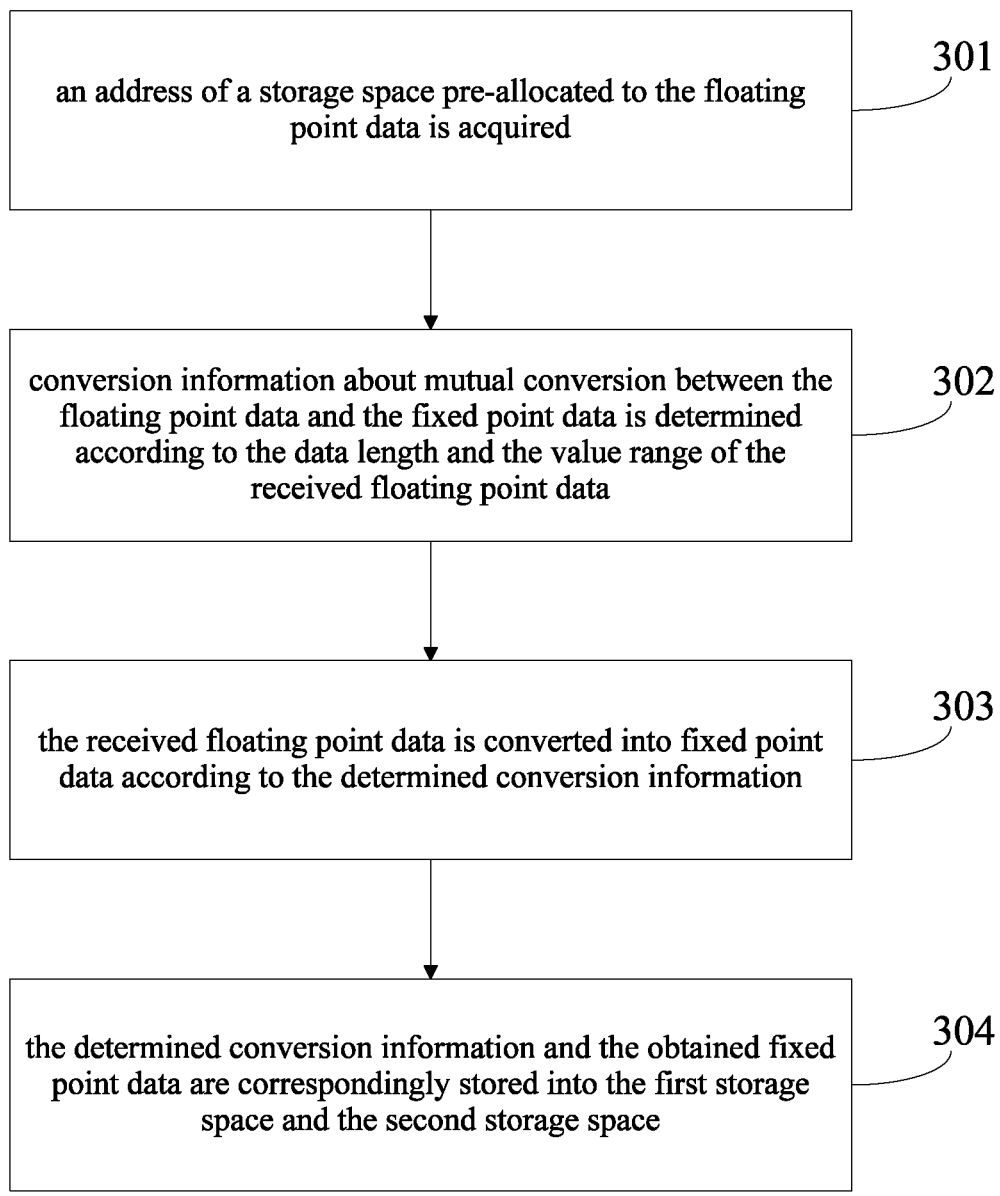
FIG. 3 is a flow chart of an implementation of converting floating point data into fixed point data in the data processing method according to the present application.

In some optional implementations of this embodiment, as shown in FIG. 3, step 202 "converting the received floating point data into fixed point data according to a data length and a value range of the received floating point data" may be implemented by performing the following steps.

At step 301, an address of a storage space pre-allocated to the floating point data is acquired.

In this implementation, a processor (for example, the dedicated processor 102 in FIG. 1) on which the data processing method runs may acquire an address of a storage space pre-allocated to the floating point data. Herein, the storage space includes a first storage space and a second storage space.

As an example, the data length of the floating point data may be four bytes, eight bytes, or the like.

At step 302, conversion information about mutual conversion between the floating point data and the fixed point data is determined according to the data length and the value range of the received floating point data.

In this implementation, the processor (for example, the dedicated processor 102 in FIG. 1) on which the data processing method runs may determine, according to the data length and the value range of the received floating point data, conversion information about mutual conversion between the floating point data and the fixed point data.

In some optional implementations of this embodiment, the conversion information about mutual conversion between the floating point data and the fixed point data may be determined according to the data length and the value range of each piece of the received floating point data.

In some optional implementations of this embodiment, the determining, according to the data length and the value range of the received floating point data, conversion information about mutual conversion between the floating point data and the fixed point data may include: defining a predetermined number of pieces of received floating point data as a floating point data set; comparing value ranges of the pieces of floating point data in the floating point data set to determine a first maximum value range; and determining first conversion information according to a preset first data length and the determined first maximum value range, the first conversion information being used for converting the pieces of floating point data in the floating point data set into fixed point data.

In this implementation, before the value ranges of the pieces of floating point data in the floating point data set are compared, a predetermined number of pieces of received floating point data may be saved to a temporary storage space first. Then, the comparing and determining steps are performed.

In this implementation, the first conversion information may include the first data length and the first maximum value range.

In this implementation, the first conversion information may include the first data length, the first maximum value range, and first conversion precision, the first conversion precision being the reciprocal of the first maximum value range.

In this implementation, the first conversion information may include the first data length and first conversion precision, the first conversion precision being the reciprocal of the first maximum value range.

As an example, 10 pieces of received floating point data is used as a floating point data set, the data lengths and value ranges of the 10 pieces of floating point data in the floating point data set are compared to determine a first maximum value range, and a preset first data length is determined. For example, the first data length is x, and the first maximum value range is y, and it can be obtained that the first conversion precision is the reciprocal of the first maximum value range, that is, 1/y; (x, y, 1/y) is determined as first conversion information, that is, conversion information for converting the 10 pieces of floating point data in the floating point data set into fixed point data.

At step 303, the received floating point data is converted into fixed point data according to the determined conversion information.

In this implementation, the processor (for example, the dedicated processor 102 shown in FIG. 1) on which the data processing method runs may convert the received floating point data into fixed point data according to the determined conversion information.

As an example, the floating point data is a, the determined first conversion information is the first data length and the first conversion precision (x, 1/y), and the fixed point data is a×(1/y)×(1<<(x−1)−1), where "<<" is a left shift operator. In addition, the reason of subtracting 1 from the first data length before performing a left shift is because generally a sign bit is set at the leftmost end of the floating point data. If the manner of setting a sign bit at the leftmost end of the floating point data is not used, it may not need to subtract 1 from the first data length before performing a left shift.

It should be understood by those skilled in the art that, after the conversion information is determined, how to convert floating point data into fixed point data according to the determined conversion information is well-known to those skilled in the art. Because the key point of this embodiment compared with the prior art lies in how to determine the conversion information, how to convert floating point data into fixed point data according to the determined conversion information will not be repeatedly described here.

At step 304, the determined conversion information and the obtained fixed point data are correspondingly stored into the first storage space and the second storage space.

In this implementation, the processor (for example, the dedicated processor 102 in FIG. 1) on which the data processing method runs may correspondingly store the determined conversion information and the obtained fixed point data to the first storage space and the second storage space.

In some optional implementations of this embodiment, the above-mentioned processor may further send an address of the second storage space to the electronic device, as a storage address of the received floating point data. The electronic device determines by default that the second storage space is a storage address of the floating point data. When calling the floating point data, the electronic device can call the floating point data stored in the second storage space by using the address of the second storage space. The electronic device determines by default that the manner used by the above-mentioned processor to process the floating point data is floating point calculation. That is, the calculation process of the above-mentioned processor is transparent to the electronic device, so that fixed point calculation of any precision can be used at the above-mentioned processor, thereby achieving more flexible data processing.

At step 203, calculation is performed on the obtained fixed point data according to a preset algorithm to obtain result data in the fixed point form.

In this implementation, the processor (for example, the dedicated processor 102 in FIG. 1) on which the data processing method runs may perform calculation on the obtained fixed point data according to a preset algorithm and obtain result data in fixed point form.

As an example, the preset algorithm may be a weighting algorithm. For example, 10 pieces of fixed point data are obtained through conversion, corresponding weights are set in advance for the 10 pieces of data, and the preset algorithm multiplies each piece of fixed point data by the corresponding weight, to obtain 10 pieces of result data in fixed point form.

As an example, the preset algorithm may alternatively be a weighted summation algorithm. For example, 10 pieces of fixed point data are obtained through conversion, corresponding weights are set in advance for the 10 pieces of data, and the preset algorithm multiplies each piece of fixed point data by the corresponding weight and then sums up the 10 products obtained, to obtain one piece of result data in fixed point form.

It should be understood by those skilled in the art that, various preset algorithms may be used, which cannot be enumerated, and therefore will not be repeatedly described here.

At step 204, the obtained result data in the fixed point form is converted into result data in the floating point form and the result data in the floating point form is sent to the electronic device.

In this implementation, the processor (for example, the dedicated processor 102 in FIG. 1) on which the data processing method runs may convert the obtained result data in fixed point form into result data in floating point form first, and then send the result data in floating point form to the electronic device.

In some optional implementations of this embodiment, the result data in fixed point form may be converted into result data in floating point form according to the preset algorithm and the conversion information of the obtained fixed point data.

It should be understood by those skilled in the art that, specific implementation of how to convert result data in fixed point form into result data in floating point form according to the preset algorithm and the conversion information of the obtained fixed point data can be reasonably derived by those skilled in the art with reference to the prior art. Specific implementation of the conversion is not the key point of this step, and will not be repeatedly described here.

The data processing method provided in this embodiment, by converting floating point data received from an electronic device into fixed point data, performing fixed point calculation, and converting the calculation result into result data in floating point form and sending the result data in floating point form to the electronic device, improves the data processing efficiency for the electronic device.

Figure 4:
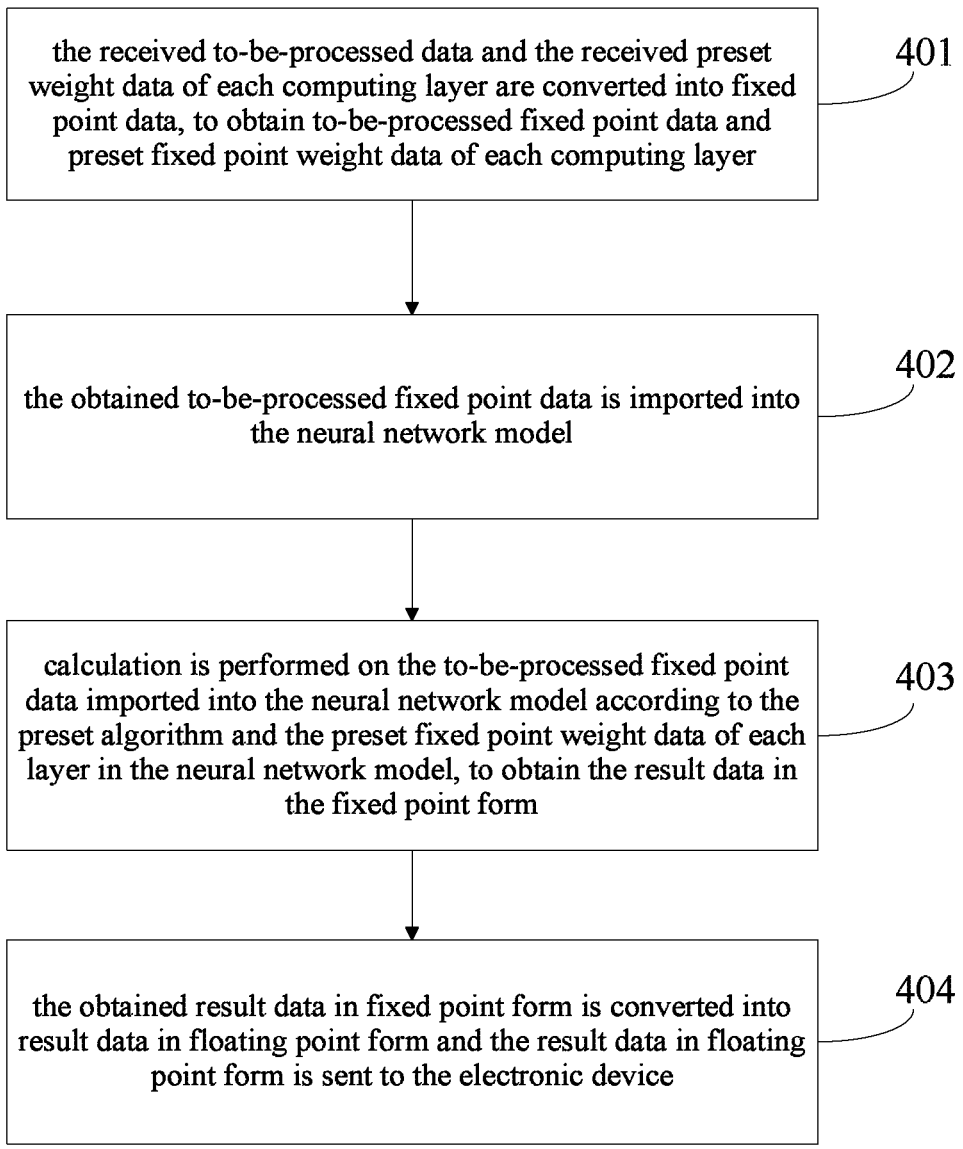
FIG. 4 is a flow chart of a data processing method according to another embodiment of the present application.

Referring to FIG. 4, a flow 400 of a data processing method according to another embodiment of the present application is illustrated. The flow 400 of the data processing method includes the following steps.

At step 401, the received to-be-processed data and the received preset weight data of each computing layer are converted into fixed point data, to obtain to-be-processed fixed point data and preset fixed point weight data of each computing layer.

In this embodiment, the processor (for example, the dedicated processor 102 in FIG. 1) on which the data processing method runs may convert the received to-be-processed data and the received preset weight data of each computing layer into fixed point data, to obtain to-be-processed fixed point data and preset fixed point weight data of each computing layer. Herein, the to-be-processed fixed point data is to-be-processed data in fixed point form, and the preset fixed point weight data is preset weight data in fixed point form.

Herein, the to-be-processed data and the preset weight data of each computing layer are data received by the electronic device. Each computing layer is a computing layer of a preset neural network model, that is, the neural network model includes at least one computing layer including a preset algorithm and preset weight data.

It should be understood by those skilled in the art that, there may be various computing layers in the neural network model, for example, a convolutional layer, a fully-connected layer, and a pooling layer. Some layers such as the pooling layer may not have preset weight data. The neural network model may include at least one computing layer including a preset algorithm and preset weight data, and may also include a computing layer that does not have preset weight data. The computing layer involved in this embodiment is a computing layer including a preset algorithm and preset weight data.

How to convert the received preset weight data of each computing layer into fixed point data can be referred to the related descriptions in the embodiments corresponding to FIG. 2 and FIG. 3, and will not be repeatedly described here.

At step 402, the obtained to-be-processed fixed point data is imported into the neural network model.

In this embodiment, the processor (for example, the dedicated processor 102 in FIG. 1) on which the data processing method runs may import the to-be-processed fixed point data obtained at step 401 to the neural network model.

At step 403, calculation is performed on the to-be-processed fixed point data imported into the neural network model according to the preset algorithm and the preset fixed point weight data of each layer in the neural network model, to obtain the result data in the fixed point form.

In this embodiment, the processor (for example, the dedicated processor 102 in FIG. 1) on which the data processing method runs may perform calculation performed on the to-be-processed fixed point data imported to the neural network model according to the preset algorithm and the preset fixed point weight data of each layer in the neural network model, and obtain result data in fixed point form.

In some optional implementations of this embodiment, after obtaining the result data in fixed point form for each computing layer, the above-mentioned processor may further convert the result data in fixed point form into result data in floating point form, and then determine conversion information about the result data in floating point form according to the obtained result data in floating point form. Specific implementation can be referred to the following descriptions.

In this implementation, for each computing layer in the neural network model that includes a preset algorithm and preset weight data, calculation is performed on fixed point data inputted to the layer according to the preset algorithm and the preset fixed point weight data of the layer, to obtain multiple pieces of output data in fixed point form of the layer as a first output data set. As an example, if the computing layer in the above-mentioned implementation is the first computing layer including a preset algorithm and preset weight data in the neural network model, the to-be-processed fixed point data may be used as the data inputted to this layer. First, the to-be-processed fixed point data is multiplied by the corresponding preset fixed point weight data, and calculation is further performed on the products by using the preset algorithm of this layer, to obtain multiple pieces of output data in fixed point form of this layer. As an example, if the computing layer in the above-mentioned implementation is a computing layer other than the first computing layer including a preset algorithm and preset weight data in the neural network model, multiple pieces of output data in fixed point form of a previous layer may be used as the data inputted to this layer. The data inputted to this layer is multiplied by the preset fixed point weight data of this layer, and then calculation is further performed on the products by using the preset algorithm of this layer, to obtain multiple pieces of output data in fixed point form of this layer.

In this implementation, for each piece of output data in the first output data set, the output data in fixed point form is converted into output data in floating point form according to conversion information about the obtained fixed point data and preset fixed point weight data of the piece of output data, to obtain a second output data set. Herein, the obtained fixed point data of the piece of output data may be the data inputted to this layer, and the obtained preset fixed point weight data of the piece of output data may be fixed point weight data corresponding to the data inputted to this layer.

It should be understood by those skilled in the art that, how to convert the output data in fixed point form into output data in floating point form according to conversion information about obtained fixed point data and preset fixed point weight data of the piece of output data is related to the preset algorithm, and under the teaching of this embodiment, those skilled in the art can reasonably derive, depending on the specific algorithm, how to convert the output data in fixed point form into output data in floating point form according to conversion information about obtained fixed point data and preset fixed point weight data of the piece of output data, which will not be repeatedly described here.

In this implementation, second conversion information about the output data in fixed point form in the first output data set is determined according to a maximum data length and a maximum value range of the pieces of output data in floating point form in the second output data set, the second conversion information being used for converting the output data in fixed point form in the first output data set into output data in floating point form; or when the output data in fixed point form in the first output data set is used as data inputted to a next layer, conversion information about the output data in fixed point form may be determined according to the second conversion information, so as to the output data in fixed point form of the next layer into output data in floating point form.

Specific implementation of how to determine second conversion information about the output data in fixed point form in the first output data set according to the maximum data length and the maximum value range of the pieces of output data in floating point form in the second output data set can be referred to the related description in the embodiment corresponding to FIG. 3, and will not be repeatedly described here.

At step 404, the obtained result data in fixed point form is converted into result data in floating point form and the result data in floating point form is sent to the electronic device.

In this embodiment, the processor (for example, the dedicated processor 102 in FIG. 1) on which the data processing method runs may convert the obtained result data in fixed point form into result data in floating point form and send the result data in floating point form to the electronic device As can be seen from FIG. 4, compared with the embodiment corresponding to FIG. 2, the flow 400 of the data processing method in this embodiment describes the application of the data processing method in a neural network model. Therefore, the solution provided in this embodiment can improve the efficiency of data processing using a neural network model.

Figure 5:
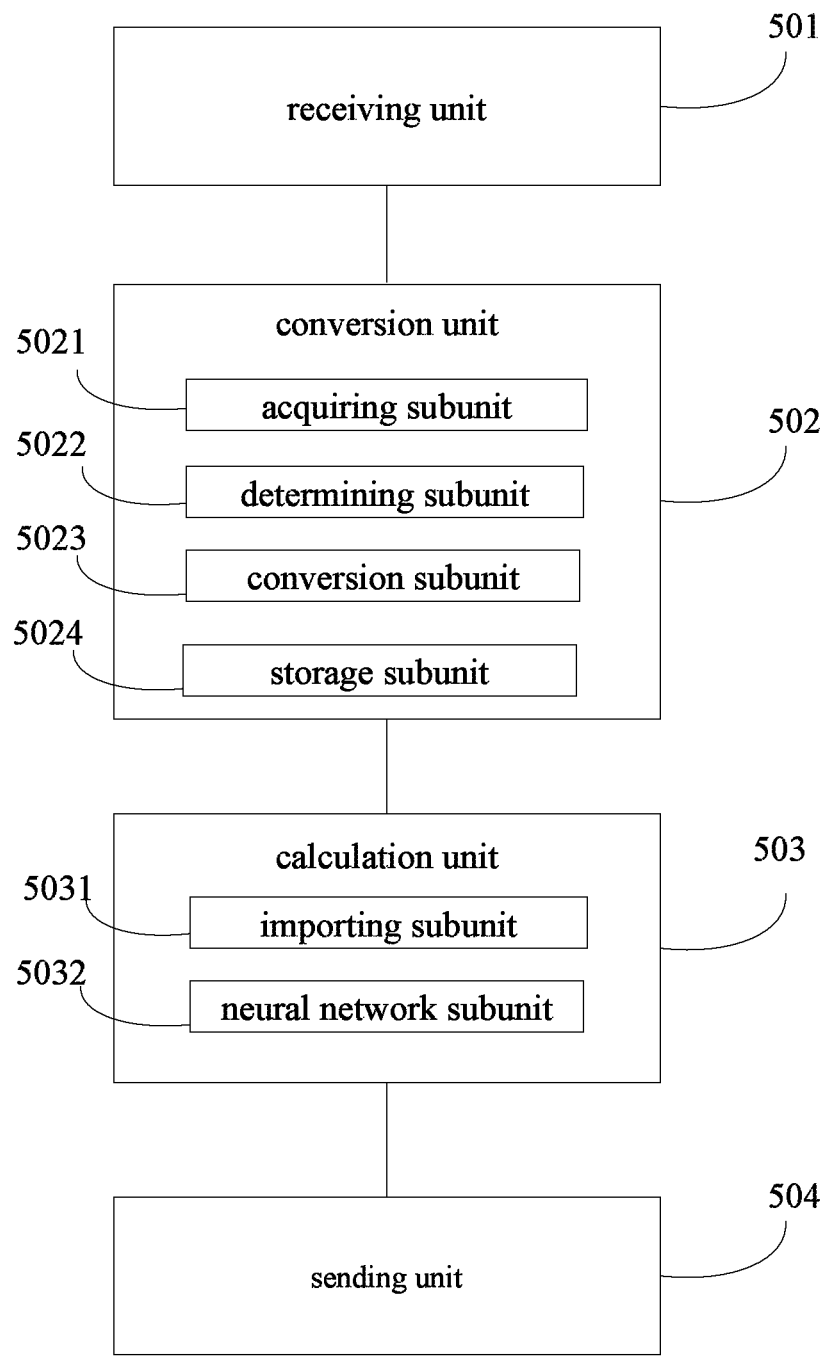
FIG. 5 is a schematic structural diagram of a data processing apparatus according to an embodiment of the present application.

Referring to FIG. 5, as an implementation of the methods shown in the above-mentioned figures, the present application provides an embodiment of a data processing apparatus. This apparatus embodiment corresponds to the method embodiment shown in FIG. 2. The apparatus may be specifically applied to the dedicated processor 102 shown in FIG. 1.

As shown in FIG. 5, the data processing apparatus 500 in this embodiment includes: a receiving unit 501, a conversion unit 502, a calculation unit 503, and a sending unit 504. The receiving unit 501 is configured to receive floating point data sent from an electronic device. The conversion unit 502 is configured to convert the received floating point data into fixed point data according to a data length and a value range of the received floating point data. The calculation unit 503 is configured to perform calculation on the obtained fixed point data according to a preset algorithm to obtain result data in fixed point form. The sending unit 504 is configured to convert the obtained result data in fixed point form into result data in floating point form and send the result data in floating point form to the electronic device.

In this embodiment, the receiving unit 501 of the data processing apparatus 500 may receive floating point data sent by an electronic device (for example, the general-purpose processor 101 shown in FIG. 1).

In this embodiment, based on floating point data received by the receiving unit 501, the conversion unit 502 may determine the data length and the value range of the received floating point data first, and then convert the received floating point data into fixed point data according to the determined data length and value range.

In this embodiment, the calculation unit 503 may perform calculation on the obtained fixed point data according to a preset algorithm and obtain result data in fixed point form.

In this embodiment, the sending unit 504 may convert the obtained result data in fixed point form into result data in floating point form first, and then send the result data in floating point form to the electronic device.

In some optional implementations of this embodiment, the conversion unit 502 may include: an acquiring subunit 5021, configured to acquire an address of a storage space pre-allocated to the floating point data, the storage space including a first storage space and a second storage space; a determining subunit 5022, configured to determine, according to the data length and the value range of the received floating point data, conversion information about mutual conversion between the floating point data and the fixed point data; a conversion subunit 5023, configured to convert the received floating point data into fixed point data according to the determined conversion information; and a storage subunit 5024, configured to correspondingly store the determined conversion information and the obtained fixed point data to the first storage space and the second storage space.

In some optional implementations of this embodiment, the determining subunit 5022 may be further configured to: define a predetermined number of pieces of received floating point data as a floating point data set; compare value ranges of the pieces of floating point data in the floating point data set to determine a first maximum value range; and determine first conversion information according to a preset first data length and the first maximum value range, the first conversion information being used for converting the pieces of floating point data in the floating point data set into fixed point data.

In some optional implementations of this embodiment, the received floating point data may include to-be-processed data and preset weight data of each computing layer in a neural network model, the neural network model including at least one computing layer including a preset algorithm and preset weight data; and the conversion unit 502 may be further configured to: convert the received to-be-processed data and the received preset weight data of each computing layer into fixed point data, to obtain to-be-processed fixed point data and preset fixed point weight data of each computing layer.

In some optional implementations of this embodiment, the calculation unit 503 may further include: an importing subunit 5031, configured to import the obtained to-be-processed fixed point data into the neural network model; and a neural network subunit 5032, configured to perform calculation on the to-be-processed fixed point data imported into the neural network model according to the preset algorithm and the preset fixed point weight data of each layer in the neural network model, to obtain the result data in fixed point form.

In some optional implementations of this embodiment, the neural network subunit 5032 may be further configured to: for each computing layer in the neural network model that includes a preset algorithm and preset weight data, perform calculation on fixed point data inputted to the layer according to the preset algorithm and the preset fixed point weight data of the layer, to obtain multiple pieces of output data in fixed point form of the layer as a first output data set; for each piece of output data in the first output data set, converting the output data in fixed point form into output data in floating point form according to conversion information about obtained fixed point data and preset fixed point weight data of the piece of output data, to obtain a second output data set; determine second conversion information about the output data in fixed point form in the first output data set according to a maximum data length and a maximum value range of the pieces of output data in floating point form in the second output data set, the second conversion information being used for converting the output data in fixed point form in the first output data set into output data in floating point form.

Specific implementation of the data processing apparatus provided in this embodiment and the technical effects achieved thereby can be referred to the related descriptions in the embodiments corresponding to FIG. 2 to FIG. 4, and will not be repeatedly described here.

The data processing method provided in the above embodiments of the present application may be applied to a system that uses a hardware architecture such as an FPGA to process services. The FPGA may include a calculation unit and a storage unit. The FPGA communicates with an electronic device including the above-mentioned general-purpose processor (for example, CPU) via a PCI-E interface. The FPGA may acquire to-be-processed floating point data from the general-purpose processor via the PCI-E interface and return a processing result to the above-mentioned general-purpose processor via the PCI-E interface.

The flow charts and block diagrams in the figures illustrate architectures, functions and operations that may be implemented according to the system, the method and the computer program product of the various embodiments of the present application. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a receiving unit, a conversion unit, a calculation unit, and a sending unit, where the names of these units are not considered as a limitation to the units. For example, the receiving unit may also be described as "a unit for receiving floating point data sent by an electronic device".

In another aspect, the present application further provides a non-transitory computer storage medium. The computer storage medium may be the non-transitory computer storage medium included in the apparatus in the above embodiments, or a stand-alone computer storage medium which has not been assembled into the apparatus. The non-transitory computer storage medium stores one or more programs. When the one or more programs are executed by a device, the device is to: receive floating point data sent from an electronic device; convert the received floating point data into fixed point data according to a data length and a value range of the received floating point data; perform calculation on the obtained fixed point data according to a preset algorithm to obtain result data in a fixed point form; and convert the obtained result data in the fixed point form into result data in a floating point form and send the result data in the floating point form to the electronic device. This implementation improves the data processing efficiency.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A data processing method, comprising:
   receiving floating point data sent from an electronic device, the received floating point data comprises to-be-processed data and preset weight data of each computing layer in a neural network model, the neural network model comprises at least one computing layer comprising the preset algorithm and the preset weight data;
   acquiring an address of a storage space pre-allocated to the floating point data, the storage space comprising a first storage space and a second storage space;
   determining conversion information for mutual conversion between the floating point data and fixed point data according to a data length and a value range of the received floating point data;
   converting the received to-be-processed data and the received preset weight data of each computing layer into fixed point data according to the determined conversion information, to obtain to-be-processed fixed point data and preset fixed point weight data of the each computing layer;
   storing the determined conversion information and the obtained fixed point data relatively into the first storage space and the second storage space;
   importing the obtained to-be-processed fixed point data into the neural network model;
   performing calculation on the to-be-processed fixed point data imported into the neural network model according to the preset algorithm and the preset fixed point weight data of each layer in the neural network model, to obtain result data in a fixed point form, comprising: for each computing layer comprising the preset algorithm and the preset weight data in the neural network model, performing calculation on fixed point data imported into the layer according to the preset algorithm and the preset fixed point weight data of the each computing layer, to obtain multiple pieces of output data in the fixed point form of the each computing layer as a first output data set for each piece of output data in the first output data set, converting the output data in the fixed point form into output data in a floating point form according to conversion information for the obtained fixed point data and preset fixed point weight data of the piece of output data, to obtain a second output data set and determining second conversion information for the output data in the fixed point form in the first output data set according to a maximum data length and a maximum value range of the pieces of output data in the floating point form in the second output data set, the second conversion information being used for converting the output data in the fixed point form in the first output data set into output data in the floating point form; and
   converting the obtained result data in the fixed point form into result data in a floating point form and sending the result data in the floating point form to the electronic device.

2. The method according to claim 1, wherein the determining conversion information for mutual conversion between the floating point data and the fixed point data according to the data length and the value range of the received floating point data comprises:
   defining a predetermined number of pieces of received floating point data as a floating point data set;
   comparing value ranges of the pieces of floating point data in the floating point data set to determine a first maximum value range; and
   determining first conversion information according to a preset first data length and the determined first maximum value range, the first conversion information being used for converting the pieces of floating point data in the floating point data set into fixed point data.

3. A data processing apparatus, comprising:
   at least one processor; and
   a memory storing instructions, which when executed by the at least one processor, cause the at least one processor to perform operations, the operations comprising:
   receiving floating point data sent from an electronic device, the received floating point data comprises to-be-processed data and preset weight data of each computing layer in a neural network model, the neural network model comprises at least one computing layer comprising the preset algorithm and the preset weight data;
   acquiring an address of a storage space pre-allocated to the floating point data, the storage space comprising a first storage space and a second storage space;

determining conversion information for mutual conversion between the floating point data and fixed point data according to a data length and a value range of the received floating point data;

converting the received to-be-processed data and the received preset weight data of each computing layer into fixed point data according to the determined conversion information, to obtain to-be-processed fixed point data and preset fixed point weight data of the each computing layer;

storing the determined conversion information and the obtained fixed point data relatively into the first storage space and the second storage space;

importing the obtained to-be-processed fixed point data into the neural network model;

performing calculation on the to-be-processed fixed point data imported into the neural network model according to the preset algorithm and the preset fixed point weight data of each layer in the neural network model, to obtain result data in a fixed point form, comprising: for each computing layer comprising the preset algorithm and the preset weight data in the neural network model, performing calculation on fixed point data imported into the layer according to the preset algorithm and the preset fixed point weight data of the each computing layer, to obtain multiple pieces of output data in the fixed point form of the each computing layer as a first output data set for each piece of output data in the first output data set, converting the output data in the fixed point form into output data in a floating point form according to conversion information for the obtained fixed point data and preset fixed point weight data of the piece of output data, to obtain a second output data set and determining second conversion information for the output data in the fixed point form in the first output data set according to a maximum data length and a maximum value range of the pieces of output data in the floating point form in the second output data set, the second conversion information being used for converting the output data in the fixed point form in the first output data set into output data in the floating point form; and converting the obtained result data in the fixed point form into result data in a floating point form and sending the result data in the floating point form to the electronic device.

4. The apparatus according to claim 3, wherein the determining conversion information for mutual conversion between the floating point data and the fixed point data according to the data length and the value range of the received floating point data comprises:

defining a predetermined number of pieces of received floating point data as a floating point data set;

comparing value ranges of the pieces of floating point data in the floating point data set to determine a first maximum value range; and determining first conversion information according to a preset first data length and the determined first maximum value range, the first conversion information being used for converting the pieces of floating point data in the floating point data set into fixed point data.

5. A non-transitory storage medium storing one or more programs, the one or more programs when executed by an apparatus, causing the apparatus to perform operations, the operations comprising:

receiving floating point data sent from an electronic device, the received floating point data comprises to-be-processed data and preset weight data of each computing layer in a neural network model, the neural network model comprises at least one computing layer comprising the preset algorithm and the preset weight data;

acquiring an address of a storage space pre-allocated to the floating point data, the storage space comprising a first storage space and a second storage space;

determining conversion information for mutual conversion between the floating point data and fixed point data according to a data length and a value range of the received floating point data;

converting the received to-be-processed data and the received preset weight data of each computing layer into fixed point data according to the determined conversion information, to obtain to-be-processed fixed point data and preset fixed point weight data of the each computing layer;

storing the determined conversion information and the obtained fixed point data relatively into the first storage space and the second storage space;

importing the obtained to-be-processed fixed point data into the neural network model;

performing calculation on the to-be-processed fixed point data imported into the neural network model according to the preset algorithm and the preset fixed point weight data of each layer in the neural network model, to obtain result data in a fixed point form, comprising: for each computing layer comprising the preset algorithm and the preset weight data in the neural network model, performing calculation on fixed point data imported into the layer according to the preset algorithm and the preset fixed point weight data of the each computing layer, to obtain multiple pieces of output data in the fixed point form of the each computing layer as a first output data set for each piece of output data in the first output data set, converting the output data in the fixed point form into output data in a floating point form according to conversion information for the obtained fixed point data and preset fixed point weight data of the piece of output data, to obtain a second output data set and determining second conversion information for the output data in the fixed point form in the first output data set according to a maximum data length and a maximum value range of the pieces of output data in the floating point form in the second output data set, the second conversion information being used for converting the output data in the fixed point form in the first output data set into output data in the floating point form; and converting the obtained result data in the fixed point form into result data in a floating point form and sending the result data in the floating point form to the electronic device.

6. The non-transitory storage medium according to claim 5, wherein the determining conversion information for mutual conversion between the floating point data and the fixed point data according to the data length and the value range of the received floating point data comprises:

defining a predetermined number of pieces of received floating point data as a floating point data set;

comparing value ranges of the pieces of floating point data in the floating point data set to determine a first maximum value range; and determining first conversion information according to a preset first data length and the determined first maximum value range, the first conversion information being used for converting the pieces of floating point data in the floating point data set into fixed point data.

* * * * *